US010104666B2

(12) United States Patent
Sha et al.

(10) Patent No.: US 10,104,666 B2
(45) Date of Patent: Oct. 16, 2018

(54) METHOD AND SYSTEM FOR COMPENSATING FOR DOUBLY SELECTIVE CHANNEL AND RELATED APPARATUS

(71) Applicant: Huawei Technologies Co., Ltd., Shenzhen, Guangdong (CN)

(72) Inventors: Xuejun Sha, Harbin (CN); Yong Li, Harbin (CN); Lin Mei, Harbin (CN); Hongqiang Bao, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 15/369,462

(22) Filed: Dec. 5, 2016

(65) Prior Publication Data

US 2017/0094665 A1 Mar. 30, 2017

Related U.S. Application Data

(63) Continuation of application No. PCT/CN2015/073627, filed on Mar. 4, 2015.

(30) Foreign Application Priority Data

Jun. 6, 2014 (CN) .......................... 2014 1 0250710

(51) Int. Cl.
*H04W 72/04* (2009.01)
*H04B 1/7105* (2011.01)
(Continued)

(52) U.S. Cl.
CPC .... *H04W 72/0453* (2013.01); *H04B 1/71055* (2013.01); *H04L 1/0681* (2013.01); *H04L 5/0048* (2013.01); *H04W 24/02* (2013.01)

(58) Field of Classification Search
CPC .......................... H04W 72/0453; H04W 24/02; H04L 5/0048; H04L 1/0681; H04B 1/71055
See application file for complete search history.

(56) References Cited

U.S. PATENT DOCUMENTS 7,554,983 B1 * 6/2009 Muppala ............. H04L 41/0896
370/392
8,046,829 B2 * 10/2011 Oba ........................ H04L 63/08
726/14

(Continued)

FOREIGN PATENT DOCUMENTS

| CN | 1859346 A | 11/2006 |
| CN | 103326976 A | 9/2013 |

(Continued)

OTHER PUBLICATIONS

Yerramalli et al., "Partial FFT Demodulation: A Detection Method for Highly Doppler Distorted OFDM Systems", IEEE Transactions on Signal Processing, vol. 60, No. 11, Nov. 2012, 13 pages.

(Continued)

*Primary Examiner* — Jay P Patel

(57) ABSTRACT

A method and system for compensating for a doubly selective channel, and a related apparatus are applied to the field of communications technologies. In embodiments of the present invention, a receive end obtains, based on a minimum mean square error between a transmit pilot sequence and a receive pilot sequence, an optimal parameter used in a process of channel compensation and signal modulation, that is, a modulation order and a channel compensation parameter such as a channel compensation matrix. Therefore, according to the embodiments of the present invention, an optimization method is used to apply a banded equalization channel compensation method and a partial FFT transform to a communications system, thereby improving system performance.

14 Claims, 8 Drawing Sheets

(51) Int. Cl.
*H04L 5/00* (2006.01)
*H04W 24/02* (2009.01)
*H04L 1/06* (2006.01)

(56) References Cited

U.S. PATENT DOCUMENTS

| | | | | |
|---|---|---|---|---|
| 8,972,543 | B1* | 3/2015 | Park | H04L 43/50 709/206 |
| 2003/0191843 | A1* | 10/2003 | Balissat | H04L 63/0281 709/227 |
| 2003/0193889 | A1* | 10/2003 | A. Jacobsen | H04L 27/2608 370/208 |
| 2003/0219022 | A1* | 11/2003 | Dillon | H04L 12/2856 370/395.52 |
| 2005/0073948 | A1* | 4/2005 | Jwa | H04L 25/0232 370/208 |
| 2006/0293056 | A1* | 12/2006 | Kim | H04W 36/18 455/442 |
| 2007/0208854 | A1* | 9/2007 | Wiryaman | H04L 63/20 709/225 |
| 2007/0211786 | A1* | 9/2007 | Shattil | H04B 1/707 375/141 |
| 2008/0107124 | A1* | 5/2008 | Ros-Giralt | H04L 29/125 370/401 |
| 2008/0130790 | A1* | 6/2008 | Forenza | H04B 7/0452 375/299 |
| 2008/0227422 | A1* | 9/2008 | Hwang | H04B 7/0452 455/278.1 |
| 2009/0046816 | A1* | 2/2009 | Hong | H04L 1/0045 375/340 |
| 2009/0110033 | A1* | 4/2009 | Shattil | H04B 1/7174 375/141 |
| 2009/0175367 | A1* | 7/2009 | Kishigami | H04B 7/084 375/260 |
| 2009/0219800 | A1* | 9/2009 | Bocquet | H04L 27/2608 370/208 |
| 2010/0205313 | A1* | 8/2010 | Boire-Lavigne | H04L 29/125 709/228 |
| 2012/0219079 | A1* | 8/2012 | Yoshimoto | H04J 11/0036 375/260 |
| 2013/0343379 | A1* | 12/2013 | Stroud | H04L 43/06 370/389 |
| 2014/0204841 | A1* | 7/2014 | Ruiz Delgado | H04B 7/0689 370/328 |
| 2014/0237585 | A1* | 8/2014 | Khan | H04L 67/02 726/15 |
| 2015/0095648 | A1* | 4/2015 | Nix | H04W 4/70 713/170 |
| 2015/0257072 | A1* | 9/2015 | Yokomakura | H04W 36/32 455/436 |
| 2015/0296417 | A1* | 10/2015 | Yokomakura | H04W 36/30 455/438 |
| 2017/0012749 | A1* | 1/2017 | Rakib | H04L 5/0007 |

FOREIGN PATENT DOCUMENTS

| | | |
|---|---|---|
| CN | 103414678 A | 11/2013 |
| CN | 103457901 A | 12/2013 |
| WO | 2005036770 A1 | 4/2005 |

OTHER PUBLICATIONS

Martone, Massimiliano (Max), "A Multicarrier System Based on the Fractional Fourier Transform for Time-Frequency-Selective Channels", IEEE Transactions on Communications, vol. 49, No. 6, Jun. 2001, 10 pages.

Li, et at., "Hybrid Carrier Communication with Partial FFT Demodulation over Underwater Acoustic Channels", IEEE Communications Letters, vol. 17, No. 12, Dec. 2013, 4 pages.

Li, et al., "Low Complexity Equalization of HCM Systems with DPFFT Demodulation over Doubly-Selective Channels", IEEE Signal Processing Letters, vol. 21, Issue 7, Jul. 2014, 4 pages.

Muralidhar et al., "A Low-Complexity Kalman Approach for Channel Estimation in Doubly-Selective OFDM Systems", IEEE Signal Processing Letters, vol. 16, No. 7, Jul. 2009, 4 pages.

Schniter, Philip, "Low-Complexity Equalization of OFDM in Doubly Selective Channels", IEEE Transactions on Signal Processing, vol. 52, No. 4, Apr. 2004, 10 pages.

Ma et al., "Optimal Training for Block Transmissions Over Doubly Selective Wireless Fading Channels", IEEE Transactions on Signal Processing, vol. 51, No. 5, May 2003, 16 pages.

* cited by examiner

METHOD AND SYSTEM FOR COMPENSATING FOR DOUBLY SELECTIVE CHANNEL AND RELATED APPARATUS

CROSS-REFERENCE TO RELATED APPLICATIONS

This application is a continuation of International Application No. PCT/CN2015/073627, filed on Mar. 4, 2015, which claims priority to Chinese Patent Application No. 201410250710.X, filed on Jun. 6, 2014, the disclosures of the aforementioned applications are hereby incorporated by reference in their entireties.

TECHNICAL FIELD

The present invention relates to the field of communications technologies, and in particular, to a method and system for compensating for a doubly selective channel, and a related apparatus.

BACKGROUND

A time- and frequency-selective fading channel, namely, a time and frequency doubly selective channel (hereinafter referred to as "doubly selective channel") is a hotspot of recent research, such as underwater acoustic communication, low orbit satellite communication, Digital video broadcasting (DVB), and Worldwide Interoperability for Microwave Access (WiMAX). Channels for transmission in these communication application fields are all doubly selective channels. A doubly selective fading channel has significant impact on communication quality, and how to compensate for a doubly selective channel has become a problem that needs to be urgently resolved.

To compensate for a doubly selective channel, a method in the prior art is to apply partial Fast Fourier Transform (FFT) demodulation to an Orthogonal Frequency Division Multiplexing (OFDM) system. However, because the OFDM system is subject to a fast time-varying doubly selective channel, the OFDM system is affected by inter-carrier interference that is caused by a Doppler effect. In view of this, in another existing method, it is proposed that partial FFT demodulation is applied to a hybrid carrier system, which greatly improves performance; however, due to very high complexity, the method is limited in an actual application. In yet another method, by using a property of a doubly selective channel, a banded Minimum Mean Square Error (MMSE) equalization method is applied to the OFDM system, which reduces calculation complexity, but is not very ideal in terms of bit error rate performance.

SUMMARY

Embodiments of the present invention provide a method and system for compensating for a doubly selective channel, and a related apparatus, where an optimization method is used to apply a banded equalization channel compensation method and a partial FFT transform to a communications system, thereby improving system performance.

A first aspect of an embodiment of the present invention provides a communications device, including:

a signal receiving unit, configured to receive multiple time domain signals transmitted by a transmit end, where the multiple time domain signals are obtained by the transmit end by respectively performing a weighted fractional Fourier transform on multiple to-be-sent signals based on multiple different modulation orders $\alpha$, and the multiple to-be-sent signals are multiple wanted signals to which a transmit pilot sequence is added;

a fractional signal obtaining unit, configured to sequentially perform partial fast Fourier transform processing, channel compensation processing, and $(\alpha-1)^{th}$ order weighted fractional Fourier transform processing on each time domain signal of the multiple time domain signals received by the signal receiving unit, to obtain a corresponding fractional domain signal;

an extraction and calculation unit, configured to extract a receive pilot sequence in the fractional domain signal that is corresponding to each of the multiple time domain signals obtained by the fractional signal obtaining unit, and calculate a mean square error between the extracted receive pilot sequence and a transmit pilot sequence;

a selecting and determining unit, configured to select a first modulation order of a fractional domain signal corresponding to a minimum mean square error from the mean square errors that are respectively calculated by the extraction and calculation unit according to the fractional domain signals corresponding to the multiple time domain signals, and determine a channel compensation parameter corresponding to the first modulation order;

an order sending unit, configured to send the first modulation order obtained by the selecting and determining unit to the transmit end, so that the transmit end transmits a wanted signal according to the first modulation order; and a channel compensation unit, configured to perform channel compensation by using the channel compensation parameter determined by the selecting and determining unit.

In a first possible implementation manner of the first aspect of the embodiment of the present invention, the communications device further includes:

a prefix processing unit, configured to: before the fractional signal obtaining unit obtains the fractional domain signal, separately remove a prefix of the multiple time domain signals received by the signal receiving unit, where the prefix of the time domain signals is a cyclic prefix formed when the transmit end copies and places a segment of signal included in an original time domain signal in front of the original time domain signal; where the fractional signal obtaining unit is specifically configured to sequentially perform partial fast Fourier transform processing, channel compensation processing, and $(\alpha-1)^{th}$ order weighted fractional Fourier transform processing on each prefix-removed time domain signal of the multiple prefix-removed time domain signals obtained by the prefix processing unit, to obtain a corresponding fractional domain signal.

With reference to the first aspect of the embodiment of the present invention or the first possible implementation manner of the first aspect, in a second possible implementation manner of the first aspect of the embodiment of the present invention, the fractional signal obtaining unit specifically includes:

a partial fast Fourier transform unit, configured to: evenly split a wanted signal of a length M in the time domain signals received by the signal receiving unit or the prefix-removed time domain signals obtained by the prefix processing unit into Q blocks of signals; add each block of signals with a zero so that a length of each block of signals is M; and perform a Fourier transform on each zero-added block of signals to obtain a frequency domain signal of each block, where Q is greater than or equal to 2;

a compensation unit, configured to respectively perform, by using different channel compensation matrixes, channel compensation on the frequency domain signals of all the blocks obtained by the frequency domain transform unit, and superpose the compensated frequency domain signals of all the blocks to obtain a compensated frequency domain signal; and a fractional domain transform unit, configured to perform an $(\alpha-1)^{th}$ order weighted fractional Fourier transform on the frequency domain signal that is compensated by the compensation unit, to obtain a fractional domain signal.

With reference to the second possible implementation manner of the first aspect of the embodiment of the present invention, in a third possible implementation manner of the first aspect of the embodiment of the present invention, the channel compensation parameter includes a channel compensation matrix corresponding to the frequency domain signal of each block, and the selecting and determining unit specifically includes:

a selection unit, configured to select a first modulation order of a fractional domain signal corresponding to a minimum mean square error from the mean square errors that are respectively calculated by the extraction and calculation unit according to the fractional domain signals corresponding to the multiple time domain signals;

a block quantity determining unit, configured to determine a quantity Q of blocks used for partial fast Fourier transform processing when a fractional domain signal corresponding to the first modulation order is obtained; and a compensation matrix calculation unit, configured to calculate the channel compensation matrix corresponding to the frequency domain signal of each block as follows:

$$G_q = (G_{q,1}{}^H z_1, G_{q,2}{}^H z_2, \ldots, G_{q,M}{}^H z_M), q=1,2,\ldots,Q$$

where $z_k = [I]_{(k-P)|M:(k+P)|M,:}$, $k=1, 2, \ldots, M$ is used to represent a matrix including all elements from the $((k-P)|M)^{th}$ row to the $((k+P)|M)^{th}$ in an M×M identity matrix I; $G_{q,k} = (\tilde{H}_k \tilde{H}_k{}^H + N_0 I_{2P+1})^{-1} h_k$, $k=1, 2, \ldots, M$, where $I_{2P+1}$ is an identity matrix of $(2P+1)*(2P+1)$; $h_k$ is an element of the $k^{th}$ column in $\tilde{H}_k$, $k=1, 2, \ldots, M$; and $N_0$ is noise power; and $$\tilde{H}_k = \begin{cases} \hat{H}_q, & -P < p < P \\ 0, & \end{cases},$$

where $\hat{H}_q = z_k H_q$, $H_q$ is a frequency domain channel matrix of the $q^{th}$ block; the foregoing $(.)^H$ represents conjugate transpose of a matrix or a vector.

A second aspect of an embodiment of the present invention provides a communications device, including:

a time domain signal obtaining unit, configured to respectively perform, based on multiple different modulation orders $\alpha$, weighted fractional Fourier transform processing on multiple to-be-sent signals to obtain multiple time domain signals; where the multiple to-be-sent signals are multiple wanted signals to which a transmit pilot sequence is added;

a sending unit, configured to transmit the multiple time domain signals to a receive end, so that the receive end selects a first modulation order from the multiple modulation orders $\alpha$ according to the multiple time domain signals; and a transmission unit, configured to receive the first modulation order returned by the receive end and transmit a wanted signal according to the first modulation order.

In a first possible implementation manner of the second aspect of the embodiment of the present invention, the time domain signal obtaining unit is specifically configured to perform, based on multiple different modulation orders $\alpha$, an $-\alpha^{th}$ order weighted fractional Fourier transform on multiple fractional domain signals to obtain the multiple time domain signals.

With reference to the second aspect of the embodiment of the present invention or the first possible implementation manner of the second aspect, in a second possible implementation manner of the second aspect of the embodiment of the present invention, the sending unit specifically includes:

a prefix adding unit, configured to add a prefix to the time domain signals, where the prefix refers to a cyclic prefix formed by copying and placing a segment of signal included in the time domain signals in front of the time domain signals; and a signal sending unit, configured to transmit, to the receive end, the time domain signals to which the prefix is added by the prefix adding unit.

A third aspect of an embodiment of the present invention provides a system for compensating for a doubly selective channel, including a first communications device and a second communications device, where:

the first communications device is the communications device according to the first aspect of the embodiment of the present invention or any one of the first to the third possible implementation manners of the first aspect, and the second communications device is the communications device according to the second aspect of the embodiment of the present invention or the first or the second possible implementation manner of the second aspect.

A fourth aspect of an embodiment of the present invention provides a method for compensating for a doubly selective channel, including:

receiving multiple time domain signals transmitted by a transmit end, where the multiple time domain signals are obtained by the transmit end by respectively performing a weighted fractional Fourier transform on multiple to-be-sent signals based on multiple different modulation orders $\alpha$, and the multiple to-be-sent signals are multiple wanted signals to which a transmit pilot sequence is added;

sequentially performing partial fast Fourier transform processing, channel compensation processing, and $(\alpha-1)^{th}$ order weighted fractional Fourier transform processing on each time domain signal of the multiple time domain signals to obtain a corresponding fractional domain signal;

extracting a receive pilot sequence in the fractional domain signal that is corresponding to each of the multiple time domain signals, and calculating a mean square error between the extracted receive pilot sequence and a transmit pilot sequence;

selecting a first modulation order of a fractional domain signal corresponding to a minimum mean square error from the mean square errors that are respectively calculated according to the fractional domain signals corresponding to the multiple time domain signals, and determining a channel compensation parameter corresponding to the first modulation order; and sending the first modulation order to the transmit end, so that the transmit end sends a wanted signal according to the first modulation order; and performing channel compensation by using the determined channel compensation parameter.

In a first possible implementation manner of the fourth aspect of the embodiment of the present invention, after the receiving time domain signals transmitted by a transmit end, the method further includes:

removing a prefix of the time domain signals, where the prefix of the time domain signals is a cyclic prefix formed when the transmit end copies and places a segment of signal included in an original time domain signal in front of the original time domain signal; and sequentially performing partial fast Fourier transform processing, channel compensation processing, and $(\alpha-1)^{th}$ order weighted fractional Fourier transform processing on each prefix-removed time domain signal of the multiple prefix-removed time domain signals to obtain a corresponding fractional domain signal.

With reference to the fourth aspect of the embodiment of the present invention or the first possible implementation manner of the fourth aspect, in a second possible implementation manner of the fourth aspect of the embodiment of the present invention, the sequentially performing partial fast Fourier transform processing, channel compensation processing, and $(\alpha-1)^{th}$ order weighted fractional Fourier transform processing on the time domain signals or the prefix-removed time domain signals to obtain a fractional domain signal specifically includes:

evenly splitting a wanted signal of a length M in the time domain signals or the prefix-removed time domain signals into Q blocks of signals; adding each block of signals with a zero so that a length of each block of signals is M; and performing a Fourier transform on each zero-added block of signals to obtain a frequency domain signal of each block, where Q is greater than or equal to 2;

respectively performing, by using different channel compensation matrixes, channel compensation on the frequency domain signals of all the blocks, and superposing the compensated frequency domain signals of all the blocks to obtain a compensated frequency domain signal; and performing an $(\alpha-1)^{th}$ order weighted fractional Fourier transform on the compensated frequency domain signal to obtain a fractional domain signal.

With reference to the second possible implementation manner of the fourth aspect of the embodiment of the present invention, in a third possible implementation manner of the fourth aspect of the embodiment of the present invention, the channel compensation parameter includes a channel compensation matrix corresponding to the frequency domain signal of each block, and the determining a channel compensation parameter corresponding to the first modulation order specifically includes:

determining a quantity Q of blocks used for partial fast Fourier transform processing when a fractional domain signal corresponding to the first modulation order is obtained; and calculating the channel compensation matrix corresponding to the frequency domain signal of each block as follows:

$$G_q = (G_{q,1}{}^H z_1, G_{q,2}{}^H z_2, \ldots, G_{q,M}{}^H z_M), q=1,2,\ldots,Q$$

where $z_k = [I]_{(k-P)|M:(k+P)|M,:}$, k=1, 2, ..., M is used to represent a matrix including all elements from the $((k-P)|M)^{th}$ row to the $((k+P)|M)^{th}$ in an M×M identity matrix I; $G_{q,k} = (\tilde{H}_k \tilde{H}_k{}^H + N_0 I_{2P+1})^{-1} h_k$, k=1, 2, ..., M, where $I_{2P+1}$ is an identity matrix of (2P+1)*(2P+1); $h_k$ is an element of the $k^{th}$ column in $\tilde{H}_k$, k=1, 2, ..., M; and $N_0$ is noise power; and $$\tilde{H}_k = \begin{cases} \hat{H}_q, & -P < p < P \\ 0, & \end{cases}$$

where $\hat{H}_q = z_k H_q$, $H_q$ is a frequency domain channel matrix of the $q^{th}$ block; the foregoing $(.)^H$ represents conjugate transpose of a matrix or a vector.

A fifth aspect of an embodiment of the present invention provides a method for compensating for a doubly selective signal, including:

respectively performing, based on multiple different modulation orders $\alpha$, weighted fractional Fourier transform processing on multiple to-be-sent signals to obtain multiple time domain signals; where the multiple to-be-sent signals are multiple wanted signals to which a transmit pilot sequence is added;

transmitting the multiple time domain signals to a receive end, so that the receive end selects a first modulation order from the multiple modulation orders $\alpha$ according to the multiple time domain signals; and receiving the first modulation order returned by the receive end and transmitting a wanted signal according to the first modulation order.

In a first possible implementation manner of the fifth aspect of the embodiment of the present invention, the respectively performing, based on multiple different modulation orders $\alpha$, weighted fractional Fourier transform processing on multiple to-be-sent signals to obtain multiple time domain signals specifically includes:

performing, based on multiple different modulation orders $\alpha$, an $-\alpha^{th}$ order weighted fractional Fourier transform on multiple to-be-sent fractional domain signals to obtain multiple time domain signals.

With reference to the fifth aspect of the embodiment of the present invention or the first possible implementation manner of the fifth aspect, in a second possible implementation manner of the fifth aspect of the embodiment of the present invention, the transmitting the multiple time domain signals to a receive end specifically includes:

adding a prefix to the time domain signals, where the prefix refers to a cyclic prefix formed by copying and placing a segment of signal included in the time domain signals in front of the time domain signals; and transmitting, to the receive end, the time domain signals to which the prefix is added.

A receive end obtains, based on a minimum mean square error between a transmit pilot sequence and a receive pilot sequence, an optimal parameter used in a process of channel compensation and signal modulation, that is, a modulation order and a channel compensation parameter such as a channel compensation matrix. Therefore, according to the embodiments of the present invention, an optimization method is used to apply a banded equalization channel compensation method and a partial FFT transform to a communications system, thereby improving system performance.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Device Embodiment 1 of the Present Invention

Figure 1:
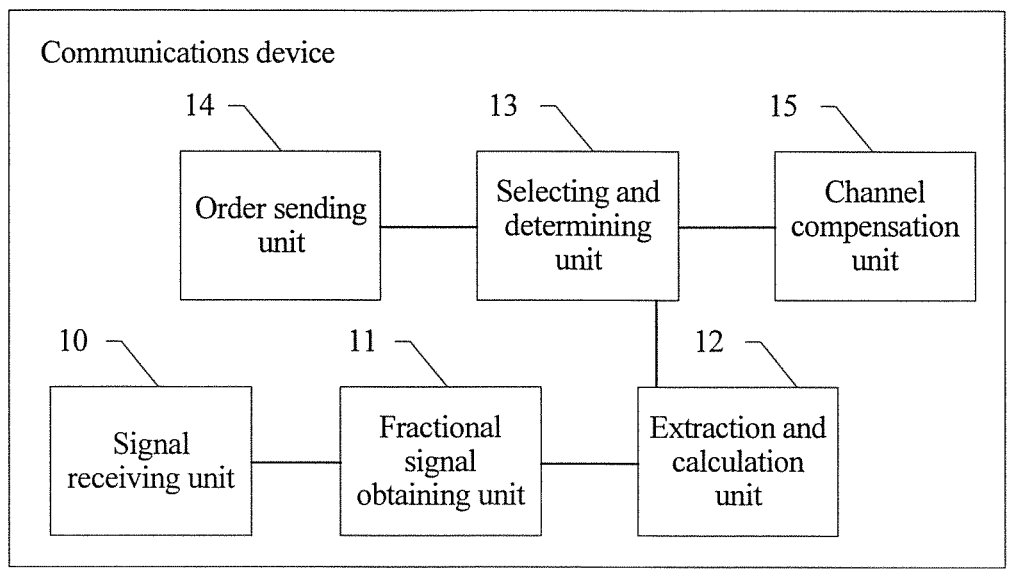
FIG. 1 is a schematic structural diagram of a communications device according to device embodiment 1 of the present invention.

A communications device is provided, where the communications device is an apparatus for compensating for a doubly selective signal, and a schematic structural diagram is shown in FIG. 1. The communications device includes: a signal receiving unit 10, a fractional signal obtaining unit 11, an extraction and calculation unit 12, a selecting and determining unit 13, an order sending unit 14, and a channel compensation unit 15.

The signal receiving unit 10 is configured to receive multiple time domain signals transmitted by a transmit end, where the multiple time domain signals transmitted by the transmit end are obtained by the transmit end by respectively performing a weighted fractional Fourier transform on multiple to-be-sent signals based on multiple different modulation orders $\alpha$, and the multiple to-be-sent signals are multiple wanted signals to which a transmit pilot sequence is added.

Specifically, the transmit end respectively inserts preset transmit pilot sequences into specific locations of the multiple wanted signals, and then modulates and sends the to-be-sent signals into which the transmit pilot sequences are inserted. Here, different transmit pilot sequences may be inserted into multiple wanted signals. For ease of calculation, in an actual application process, a same transmit pilot sequence may be inserted into multiple wanted signals.

The fractional signal obtaining unit 11 is configured to sequentially perform partial fast Fourier transform processing, channel compensation processing, and $(\alpha-1)^{th}$ order weighted fractional Fourier transform processing on each time domain signal of the multiple time domain signals received by the signal receiving unit 12 to obtain a corresponding fractional domain signal.

Here, a frequency domain signal may be obtained after the partial FFT transform is performed on a time domain signal; the channel compensation processing is to process the frequency domain signal according to the banded MMSE equalization method, specifically by multiplying a channel compensation matrix by a frequency domain signal; the $(\alpha-1)^{th}$ order weighted fractional Fourier transform processing means, in this embodiment, that an $(\alpha-1)^{th}$ order WFRFT transform is performed on the signal after signal compensation processing to obtain a fractional domain signal.

The extraction and calculation unit 12 is configured to extract a receive pilot sequence in the fractional domain signal that is corresponding to each of the multiple time domain signals obtained by the fractional signal obtaining unit 11, and calculate a mean square error between the extracted receive pilot sequence and a transmit pilot sequence.

A process of extracting the receive pilot sequence by the extraction and calculation unit 12 is inverse to a process of inserting the transmit pilot sequence by the transmit end. The extraction and calculation unit 12 obtains, by extracting, the receive pilot sequence at a specific location in the fractional domain signal. However, the transmit pilot sequence has been preset in the communications device according to this embodiment. After extracting the receive pilot sequence, the extraction and calculation unit 12 may calculate a mean square error directly according to the extracted receive pilot sequence and the preset transmit pilot sequence. In addition, the extraction and calculation unit 12 calculates a corresponding mean square error for the fractional domain signal corresponding to each time signal.

The selecting and determining unit 13 is configured to select a first modulation order of a fractional domain signal corresponding to a minimum mean square error from the mean square errors that are respectively calculated by the extraction and calculation unit 12 according to the fractional domain signals corresponding to the multiple time domain signals, and determine a channel compensation parameter corresponding to the first modulation order, for example, a channel compensation matrix. The order sending unit 14 is configured to send the first modulation order obtained by the selecting and determining unit 13 to the transmit end, so that the transmit end sends a wanted signal according to the first modulation order.

The channel compensation unit 15 is configured to perform channel compensation by using the channel compensation parameter determined by the selecting and determining unit 13.

It can be learned that, in the communications device according to this embodiment, an optimal parameter used in a process of channel compensation and signal modulation, that is, a modulation order and a channel compensation parameter such as a channel compensation matrix is obtained based on a minimum mean square error between a transmit pilot sequence and a receive pilot sequence. Therefore, an optimization method is used to apply a banded equalization channel compensation method and a partial FFT transform to a communications system, thereby improving system performance.

Figure 2:
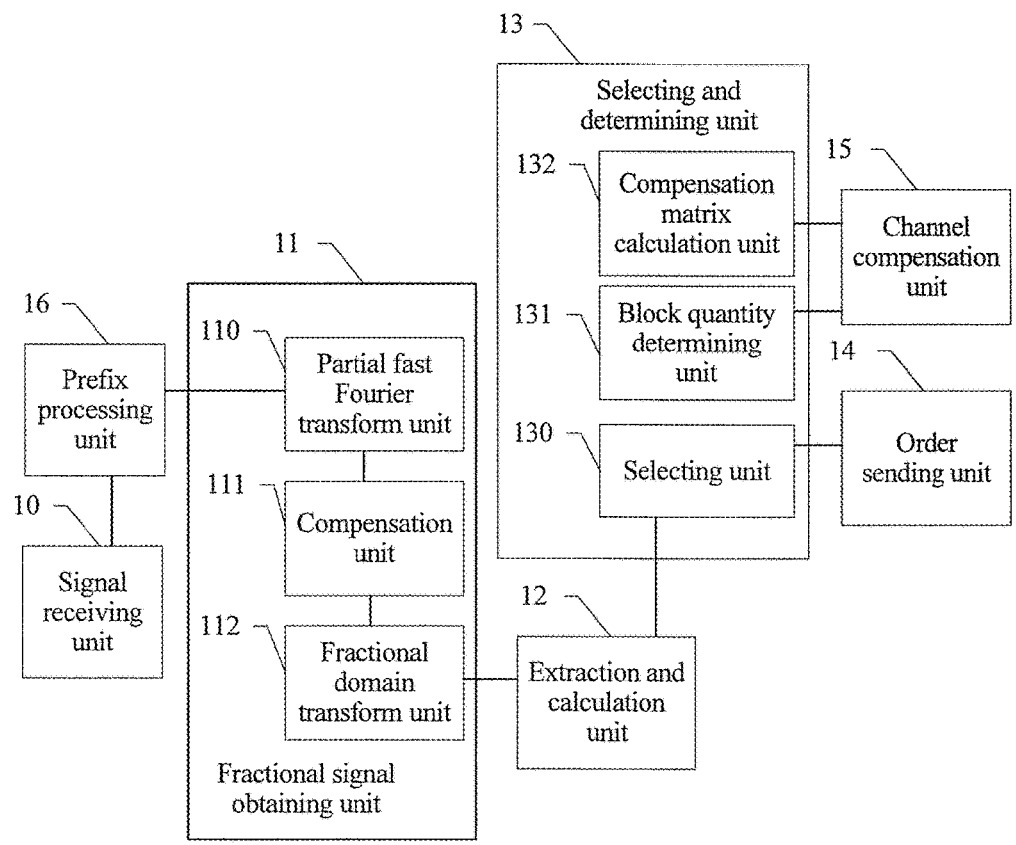
FIG. 2 is a schematic structural diagram of another communications device according to device embodiment 1 of the present invention.

Referring to FIG. 2, in a specific embodiment, in addition to including the structure shown in FIG. 1, the communications device may further include a prefix processing unit 16; where the fractional signal obtaining unit 11 may be specifically implemented by using a partial fast Fourier transform unit 110, a compensation unit 111, and a fractional domain transform unit 112, and the selecting and determining unit 13 may be implemented by using a selection unit 130, a block quantity determining unit 131, and a compensation matrix calculation unit 132.

The prefix processing unit 16 is configured to: before the fractional signal obtaining unit 11 obtains the fractional domain signal, separately remove a prefix of the multiple time domain signals received by the signal receiving unit 10, where the prefix of the time domain signals is a cyclic prefix formed when the transmit end copies and places a segment of signal included in an original time domain signal in front of the original time domain signal.

The partial fast Fourier transform unit 110 is configured to evenly split a wanted signal of a length M in the time domain signals received by the signal receiving unit 10 or the prefix-removed time domain signals obtained by the prefix processing unit 16 into Q blocks of signals; add each block of signals with a zero so that a length of each block of signals is M; and perform a Fourier transform on each zero-added block of signals to obtain a frequency domain signal of each block, where Q is greater than or equal to 2.

The compensation unit 111 is configured to respectively perform, by using different channel compensation matrixes, channel compensation on the frequency domain signals of all the blocks obtained by the frequency domain transform unit 110, and superpose the compensated frequency domain signals of all the blocks to obtain a compensated frequency domain signal.

The fractional domain transform unit 112 is configured to perform an $(\alpha-1)^{th}$ order weighted fractional Fourier transform on the frequency domain signal that is compensated by the compensation unit 111, to obtain a fractional domain signal.

The selection unit 130 is configured to select a first modulation order of a fractional domain signal corresponding to a minimum mean square error from the mean square errors that are respectively calculated by the extraction and calculation unit 12 according to the fractional domain signals corresponding to the multiple time domain signals.

The block quantity determining unit 131 is configured to determine a quantity Q of blocks used for partial fast Fourier transform processing that is performed by the frequency domain transform unit 110 included in the fractional signal obtaining unit 11, in a process of obtaining the fractional domain signal corresponding to the first modulation order.

The compensation matrix calculation unit 132 is configured to calculate, when the channel compensation unit 111 included in the fractional signal obtaining unit 11 performs channel compensation, the channel compensation matrix corresponding to the frequency domain signal of each block as follows:

$$G_q = (G_{q,1}^H z_1, G_{q,2}^H z_2, \ldots, G_{q,M}^H z_M), q=1,2,\ldots,Q$$

where $z_k = [I]_{(k-P)|M:(k+P)|M,:}$, k=1, 2, ..., M is used to represent a matrix including all elements from the $((k-P)|M)^{th}$ row to the $((k+P)|M)^{th}$ in an M×M entity matrix I;

$G_{q,k} = (\tilde{H}_k \tilde{H}_k^H + N_0 I_{2P+1})^{-1} h_k$, k=1, 2, ..., M, where $I_{2P+1}$ is an identity matrix of (2P+1)*(2P+1); $h_k$ is an element of the $k^{th}$ column in $\tilde{H}_k$, k=1, 2, ..., M; and $N_0$ is noise power; and $$\tilde{H}_k = \begin{cases} \hat{H}_q, & -P < p < P \\ 0, & \end{cases}$$

where $\hat{H}_q = z_k H_q$, $H_q$ is a frequency domain channel matrix of the $q^{th}$ block; the foregoing $(.)^H$ represents conjugate transpose of a matrix or a vector.

Therefore, in this embodiment, after the signal receiving unit 10 receives a time domain signal, the prefix processing unit 16 may first remove a prefix of the time domain signal; then three units included in the fractional signal obtaining unit 11 implement conversion of the prefix-removed time domain signal into a fractional domain signal; then the extraction and calculation unit 12 extracts a receive pilot sequence in the fractional domain signal obtained by the fractional domain transform unit 112 in the fractional signal obtaining unit 11; then the three units in the selecting and determining unit 13 obtain optimized parameters, that is, the first modulation order, the quantity of blocks, and the channel compensation matrix; and finally, the order sending unit 14 sends the first modulation order selected by the selection unit 130 in the selecting and determining unit 13 to the transmit end, the block quantity determining unit 131 transfers the determined quantity of blocks to the frequency domain transform unit 110 for a frequency domain transform, and the compensation matrix calculation unit 132 transfers the calculated channel compensation matrix to the channel compensation unit 15 for channel compensation.

Device Embodiment 2 of the Present Invention

Figure 3:
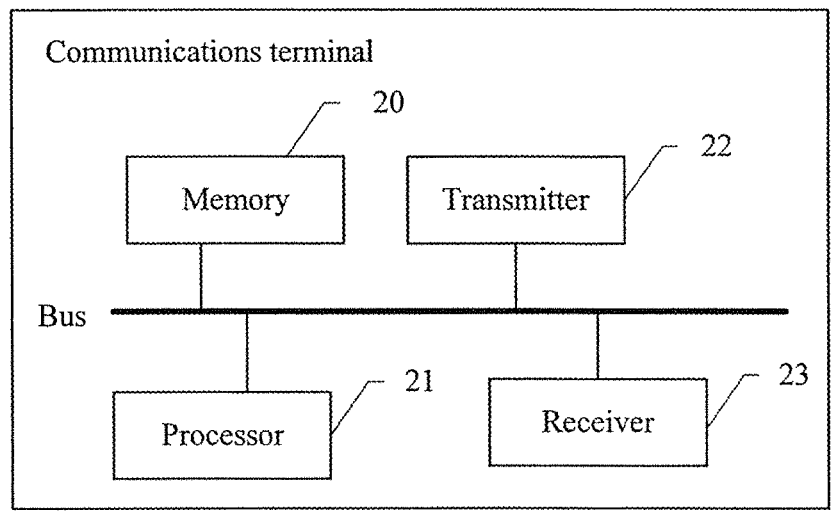
FIG. 3 is a schematic structural diagram of a communications device according to device embodiment 2 of the present invention.

A communications device is provided, where the communications device is an apparatus for compensating for a doubly selective signal, and a schematic structural diagram is shown in FIG. 3. The communications device includes: a memory 20, a processor 21, a transmitter 22, and a receiver 23 that are separately connected to a bus.

The memory 20 may store information such as a file required for data processing by the processor 21, and the transmitter 22 and the receiver 23 are ports for the communications device to communicate with another device.

In this embodiment, the receiver 23 is configured to receive multiple time domain signals transmitted by a transmit end, where the multiple time domain signals are obtained by the transmit end by respectively performing a weighted fractional Fourier transform on multiple to-be-sent signals based on multiple different modulation orders α, and the multiple to-be-sent signals are multiple wanted signals to which a transmit pilot sequence is added. Specifically, the transmit end respectively inserts preset transmit pilot sequences into specific locations of the multiple wanted signals, and then modulates and sends the to-be-sent signals into which the transmit pilot sequences are inserted. Here, different transmit pilot sequences may be inserted into multiple wanted signals. For ease of calculation, in an actual application process, a same transmit pilot sequence may be inserted into multiple wanted signals.

The processor 21 is configured to: sequentially perform partial fast Fourier transform processing, channel compensation processing, and $(\alpha-1)^{th}$ order weighted fractional Fourier transform processing on each time domain signal of the multiple time domain signals to obtain a corresponding fractional domain signal; extract a receive pilot sequence in the fractional domain signal that is corresponding to each of the multiple time domain signals, and calculate a mean square error between the extracted receive pilot sequence and a transmit pilot sequence; select a first modulation order of a fractional domain signal corresponding to a minimum mean square error from the mean square errors that are respectively calculated by the processor 21 according to the fractional domain signals corresponding to the multiple time domain signals, and determine a channel compensation parameter corresponding to the first modulation order, for example, a channel compensation matrix; and send the first modulation order to the transmit end, so that the transmit end transmits a wanted signal according to the first modulation order; and perform channel compensation by using the determined channel compensation parameter. In this way, the communications device may obtain an optimal parameter used in a process of channel compensation and signal modulation, that is, a modulation order and a channel compensation parameter such as a channel compensation matrix. An optimization method is used to apply a banded equalization channel compensation method and a partial FFT transform to a communications system, thereby improving system performance.

A frequency domain signal may be obtained after the processor 21 performs the partial FFT transform on a time domain signal; the channel compensation processing is to process the frequency domain signal according to the banded MMSE equalization method, specifically by multiplying a channel compensation matrix by a frequency domain signal; the $(\alpha-1)^{th}$ order weighted fractional Fourier transform processing means, in this embodiment, that an $(\alpha-1)^{th}$ order WFRFT transform is performed on the signal after signal compensation processing to obtain a fractional domain signal.

A process of extracting the receive pilot sequence by the processor 21 is inverse to a process of inserting the transmit pilot sequence by the transmit end. Specifically, the processor 21 obtains, by extracting, the receive pilot sequence at a specific location in the fractional domain signal. However, the transmit pilot sequence has been preset in the communications device according to this embodiment. After the receive pilot sequence is extracted, a mean square error may be calculated directly according to the extracted receive pilot sequence and the preset transmit pilot sequence.

In a specific embodiment, the processor 21 is further configured to: after the receiver receives the multiple time domain signals, separately remove a prefix of the multiple time domain signals, where the prefix of the time domain signals is a cyclic prefix formed when the transmit end copies and places a segment of signal included in an original time domain signal in front of the original time domain signal. Then the processor 21 performs a series of processing on the prefix-removed time domain signals to obtain a frequency domain signal. Specifically:

The processor 21 is specifically configured to: evenly split a wanted signal of a length M in the received time domain signals or the prefix-removed time domain signals into Q blocks of signals; add each block of signals with a zero so that a length of each block of signals is M; and perform a Fourier transform on each zero-added block of signals to obtain a frequency domain signal of each block, where Q is greater than or equal to 2; respectively perform, by using different channel compensation matrixes, channel compensation on the frequency domain signals of all the blocks, and superpose the compensated frequency domain signals of all the blocks to obtain a compensated frequency domain signal; and perform an $(\alpha-1)^{th}$ order weighted fractional Fourier transform on the compensated frequency domain signal to obtain a fractional domain signal.

Then, the processor 21 determines an optimized parameter after extracting the receive pilot sequences in the fractional domain signals and performing corresponding calculation, which is mainly as follows: the processor 21 selects a first modulation order of a fractional domain signal corresponding to a minimum mean square error from the mean square errors that are respectively calculated according to the fractional domain signals corresponding to the multiple time domain signals; determines a quantity Q of blocks used for partial fast Fourier transform processing in a process of obtaining a fractional domain signal corresponding to the first modulation order; and calculates the channel compensation matrix corresponding to the frequency domain signal of each block as follows:

$$G_q = (G_{q,1}{}^H z_1, G_{q,2}{}^H z_2, \ldots, G_{q,M}{}^H z_M), q=1,2,\ldots,Q$$

where $z_k = [I]_{(k-P)|M:(k+P)|M,:}$, k=1, 2, ..., M is used to represent a matrix including all elements from the $((k-P)|M)^{th}$ row to the $((k+P)|M)^{th}$ in an M×M identity matrix I; $G_{q,k} = (\tilde{H}_k \tilde{H}_k{}^H + N_0 I_{2P+1})^{-1} h_k$, k=1, 2, ..., M, where $I_{2P+1}$ is an identity matrix of (2P+1)*(2P+1); $h_k$ is an element of the $k^{th}$ column in $\tilde{H}_k$, k=1, 2, ..., M; and $N_0$ is noise power; and $$\tilde{H}_k = \begin{cases} \hat{H}_q, & -P < p < P \\ 0, & \end{cases}$$

where $\hat{H}_q = z_k H_q$, $H_q$ is a frequency domain channel matrix of the $q^{th}$ block; the foregoing $(.)^H$ represents conjugate transpose of a matrix or a vector.

Device Embodiment 3 of the Present Invention

Figure 4:
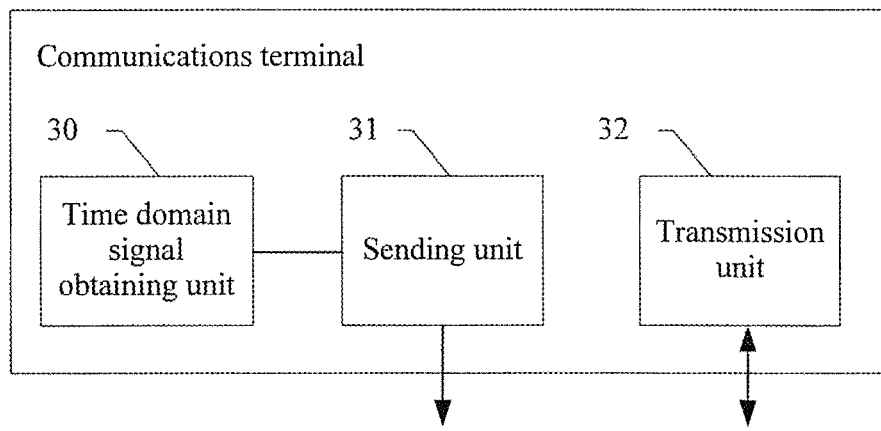
FIG. 4 is a schematic structural diagram of a communications device according to device embodiment 3 of the present invention.

A communications device is provided, where the communications device is an apparatus for compensating for a doubly selective signal, and a schematic structural diagram is shown in FIG. 4. The communications device includes: a time domain signal obtaining unit 30, a sending unit 31, and a transmission unit 32.

The time domain signal obtaining unit 30 is configured to respectively perform, based on multiple different modulation orders α, weighted fractional Fourier transform processing on multiple to-be-sent signals to obtain multiple time domain signals, where the multiple to-be-sent signals are multiple wanted signals to which a transmit pilot sequence is added. The time domain signal obtaining unit 30 is specifically configured to perform, based on multiple different modulation orders α, an $-α^{th}$ order weighted fractional Fourier transform on multiple to-be-sent fractional domain signals to obtain the multiple time domain signals. Here, different transmit pilot sequences may be inserted into multiple wanted signals. For ease of calculation, in an actual application process, a same transmit pilot sequence may be inserted into multiple wanted signals.

The sending unit 31 is configured to transmit the multiple time domain signals obtained by the time domain signal obtaining unit 30 to a receive end, so that the receive end selects a first modulation order from the multiple modulation orders α according to the multiple time domain signals.

In a specific embodiment, to prevent signal interference, the sending unit 31 may be implemented by using a prefix adding unit and a signal sending unit. Specifically, the prefix adding unit is configured to add a prefix to the time domain signals, where the prefix refers to a cyclic prefix formed by copying and placing a segment of signal included in the time domain signals in front of the time domain signals; and the signal sending unit is configured to transmit, to the receive end, the time domain signals to which the prefix is added by the prefix adding unit.

The transmission unit 32 is configured to receive the first modulation order returned by the receive end according to the multiple time domain signals sent by the sending unit 31, and transmit a wanted signal according to the first modulation order. In this way, the receive end may provide feedback to the communications device in this embodiment according to the optimized first modulation order that is obtained in the foregoing device embodiment 1, thereby improving performance of the transmission unit 32 when transmitting a wanted signal.

Device Embodiment 4 of the Present Invention

A communications device is provided, where the communications device is an apparatus for compensating for a doubly selective signal, and a schematic structural diagram is similar to that shown in FIG. 3. The communications device includes: a memory, a processor, a transmitter, and a receiver that are separately connected to a bus.

The memory may store information such as a file required for data processing by the processor, and the transmitter and the receiver are ports for the communications device to communicate with another device.

The processor in this embodiment is configured to: respectively perform, based on multiple different modulation orders α, weighted fractional Fourier transform processing on multiple to-be-sent signals to obtain multiple time domain signals, where the multiple to-be-sent signals are multiple wanted signals to which a transmit pilot sequence is added; and control the transmitter to transmit the multiple time domain signals to a receive end, so that the receive end selects a first modulation order from the multiple modulation orders α according to the multiple time domain signals. The receiver receives the first modulation order that is returned, according to the multiple time domain signals, by the receive end, and transmits a wanted signal according to the first modulation order. In this way, the receive end may provide feedback to the communications device in this embodiment according to the optimized first modulation order that is obtained in the foregoing device embodiment 1, thereby improving performance of signal transmission.

When obtaining the multiple time domain signals, the processor is specifically configured to perform, based on multiple different modulation orders α, an $-α^{th}$ weighted fractional Fourier transform on multiple to-be-sent fractional domain signals to obtain the multiple time domain signals. To prevent signal interference, the processor may further preprocess the multiple time domain signals after obtaining the multiple time domain signals. Specifically, a prefix is added to the time domain signals, where the prefix refers to a cyclic prefix formed by copying and placing a segment of signal included in the time domain signals in front of the time domain signals. Then the time domain signals to which the prefix is added are transmitted to the receive end.

An embodiment of the present invention further provides a system for compensating for a doubly selective channel, including a first communications device and a second communications device.

A structure of the first communications device is similar to a structure of the communications device according to the foregoing device embodiment 1 or 2, and a structure of the second communications device is similar to a structure of the communications device according to the foregoing device embodiment 3 or 4, and details are not described herein.

Figure 5:
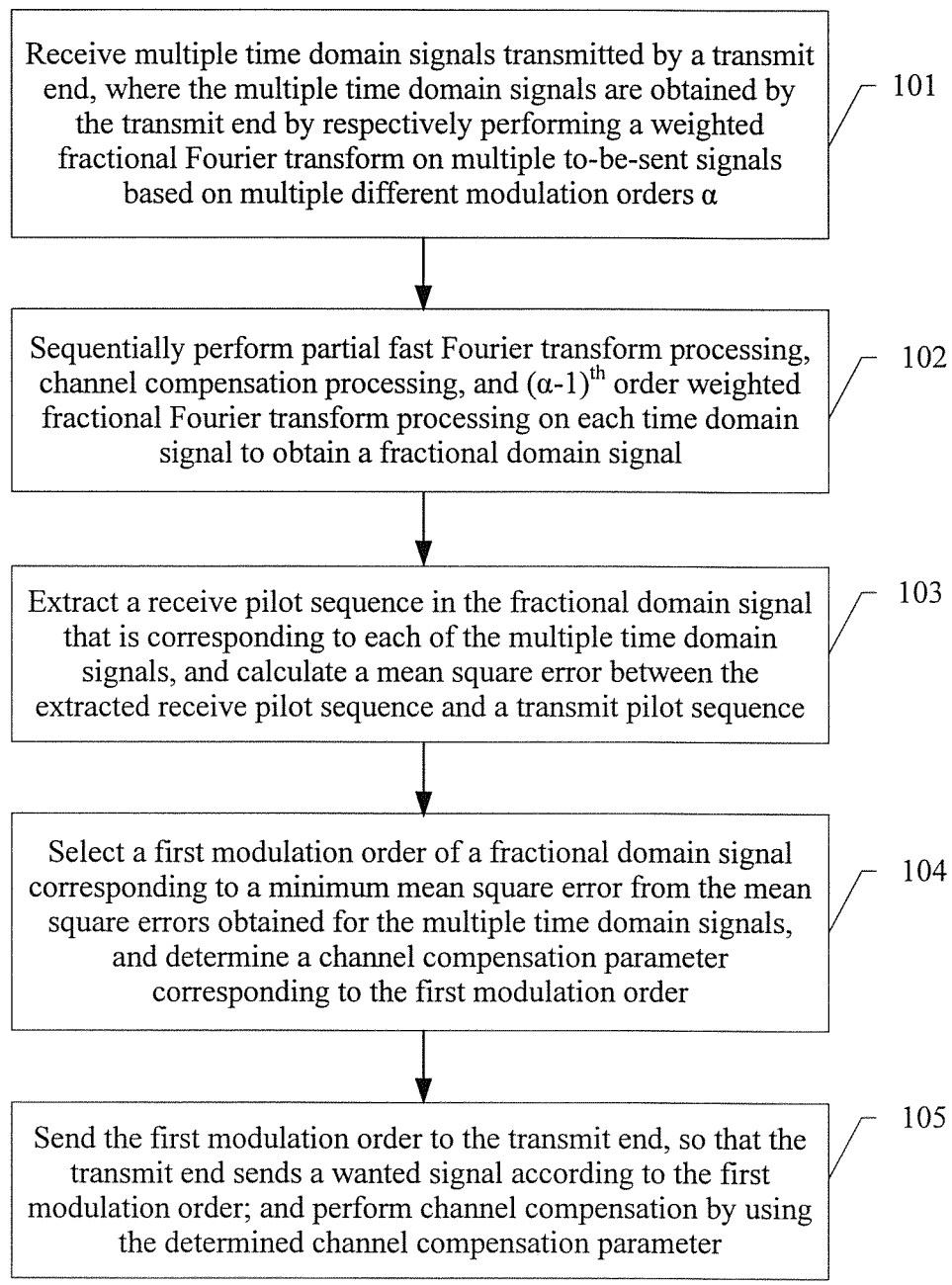
FIG. 5 is a flowchart of a method for compensating for a doubly selective channel according to an embodiment of the present invention.

An embodiment of the present invention further provides a method for compensating for a doubly selective channel, which is mainly applied to compensate for a doubly selective channel when a doubly selective channel is used for communication in a system such as a hybrid carrier system, an OFDM system, or a single carrier system. In this embodiment, the method is mainly executed by a communication receive end, that is, the communications device in the foregoing device embodiment 1 or 2. A flowchart is shown in FIG. 5, which includes:

Step 101: A receive end receives multiple time domain signals transmitted by a transmit end, where the multiple time domain signals are obtained by the transmit end by respectively performing a weighted fractional Fourier transform on multiple to-be-sent signals based on multiple different modulation orders α, and the multiple to-be-sent signals are multiple wanted signals to which a transmit pilot sequence is added.

It may be understood that, when transmitting a signal on a doubly selective channel, the transmit end respectively inserts preset transmit pilot sequences into specific locations of the multiple wanted signals, and then modulates and sends the obtained to-be-sent signals into which the transmit pilot sequences are inserted. Here, different transmit pilot sequences may be inserted into multiple wanted signals. For ease of calculation, in an actual application process, a same transmit pilot sequence may be inserted into multiple wanted signals. Specifically, in this embodiment, the transmit end performs modulation processing on the to-be-sent signals by means of weighted-type fractional Fourier transform (Weighted-type fractional Fourier transform, WFRFT). It is assumed that the to-be-sent signals are $α^{th}$ order fractional domain signals, an $-α^{th}$ order WFRFT transform is performed on the to-be-sent signals to obtain time domain signals.

Step 102: The receive end sequentially performs partial fast Fourier transform processing, channel compensation processing, and $(α-1)^{th}$ order weighted fractional Fourier transform processing on each time domain signal of the time domain signals received in step 101 to obtain a corresponding fractional domain signal.

Here, a frequency domain signal may be obtained after the partial FFT transform is performed on a time domain signal; the channel compensation processing is to process the frequency domain signal according to the banded MMSE equalization method, specifically by multiplying a channel compensation matrix by a frequency domain signal; the $(\alpha-1)^{th}$ order weighted fractional Fourier transform processing means, in this embodiment, that an $(\alpha-1)^{th}$ order WFRFT transform is performed on the signal after signal compensation processing to obtain a fractional domain signal.

It needs to be noted that, in a specific embodiment, after receiving the multiple time domain signals, the receive end needs to perform preprocessing on the multiple time domain signals at least once. A specific processing method for the preprocessing is determined by preprocessing performed by the transmit end before sending the time domain signals. For example, if the preprocessing is to add a prefix to an original time domain signal, the receive end needs to perform processing such as removing a prefix of a received time domain signal. The prefix of the time domain signal may be a cyclic prefix formed when the transmit end copies and places a segment L of signal included in an original time domain signal in front of the original time domain signal.

Step 103: The receive end extracts a receive pilot sequence in the fractional domain signal that is corresponding to each of the multiple time domain signals, and calculates a mean square error between the extracted receive pilot sequence and a transmit pilot sequence. Specifically, a process of extracting the receive pilot sequence by the receive end is inverse to a process of inserting the transmit pilot sequence by the transmit end. The receive end obtains, by extracting, the receive pilot sequence at a specific location in the fractional domain signal. However, the transmit pilot sequence has been preset in the receive end. After the receive pilot sequence is extracted, a mean square error may be calculated directly according to the extracted receive pilot sequence and the preset transmit pilot sequence.

Step 104: The receive end selects a first modulation order of a fractional domain signal corresponding to a minimum mean square error from the mean square errors that are respectively calculated according to the fractional domain signals corresponding to the multiple time domain signals, and determines a channel compensation parameter corresponding to the first modulation order.

It may be understood that, in this embodiment, to determine a relatively optimized modulation order and a relatively optimized channel compensation parameter, when sending a signal, the transmit end performs modulation processing, that is, a weighted fractional Fourier transform on multiple to-be-sent signals based on multiple different modulation orders $\alpha$, and then transmits the signals separately through a doubly selective channel. Then the receive end selects a relatively optimized modulation order and a relatively optimized channel compensation parameter by using a channel estimation method.

Step 105: The receive end sends the first modulation order to the transmit end, so that the transmit end sends a signal according to the first modulation order, and the receive end performs channel compensation by using the channel compensation parameter determined in step 104.

After the receive end separately performs steps 102 and 103 on multiple time domain signals, multiple mean square errors are obtained. Then the receive end selects a minimum mean square error, and uses a first modulation order of a fractional domain signal corresponding to the receive pilot sequence as an optimal modulation order and feeds back the order to the transmit end, where the receive pilot sequence is used to calculate the minimum mean square error. In addition, because different modulation orders correspond to different signal compensation parameters, the receive end obtains a corresponding channel compensation parameter according to the selected first modulation order, for example, a signal compensation matrix, and uses the channel compensation parameter in a subsequent channel compensation process.

It can be learned that, in this embodiment, a receive end obtains, based on a minimum mean square error between a transmit pilot sequence and a receive pilot sequence, an optimal parameter used in a process of channel compensation and signal modulation, that is, a modulation order and a channel compensation parameter such as a channel compensation matrix. Therefore, according to this embodiment of the present invention, an optimization method is used to apply a banded equalization channel compensation method and a partial FFT transform to a communications system, thereby improving system performance.

Figure 6:
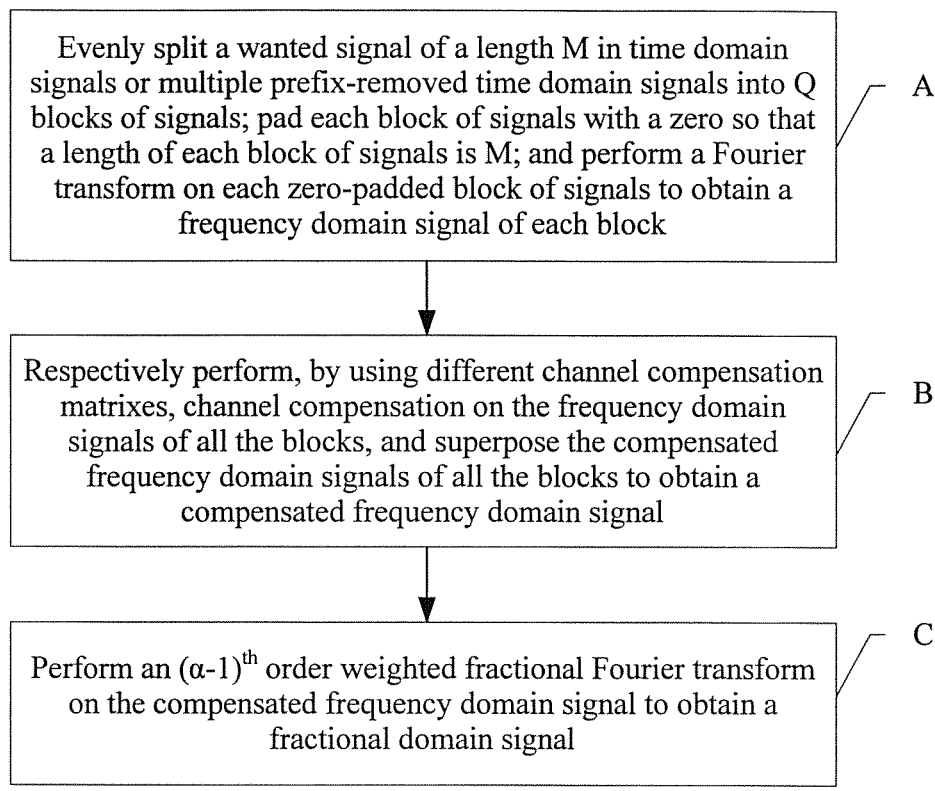
FIG. 6 is a method flowchart of performing frequency domain transform processing, channel compensation processing, and $(\alpha-1)^{th}$ order demodulation processing to obtain a fractional domain signal in a method for compensating for a doubly selective channel according to an embodiment of the present invention.

Referring to FIG. 6, in a specific embodiment, to reduce interference on a wanted signal in the signals received by the receive end, and help improve system performance, performing step 102 by the receive end may specifically include the following steps:

A: When frequency domain transform processing is performed, a wanted signal of a length M in the time domain signals received in step 101 or the time domain signals that have undergone processing at least once such as prefix removing may be evenly split into Q blocks of signals, where Q is greater than or equal to 2;

then each block of signals is added with a zero, so that a length of each block of signals is M; and a Fourier transform is performed on each zero-added block of signals to obtain a frequency domain signal of each block; therefore, after the Fourier transform is performed on each block of signals, interference on a wanted signal may be partially distributed to another unwanted signal such as a zero-added portion.

B: During channel compensation processing, channel compensation is respectively performed on frequency domain signals of all the blocks by using different channel compensation matrixes, and the compensated frequency domain signals of all the blocks are superposed to obtain a compensated frequency domain signal.

C: When $(\alpha-1)^{th}$ order weighted fractional Fourier transform processing is performed, an $(\alpha-1)^{th}$ order weighted fractional Fourier transform is performed mainly on the compensated frequency domain signal to obtain a fractional domain signal.

In a case of this embodiment, the channel compensation parameter determined by the receive end in performing step 104 may include a channel compensation matrix corresponding to the frequency domain signal of each block. Specifically, when determining a quantity Q of blocks used for performing partial FFT transform, the receive end may directly determine a quantity Q of blocks used for performing frequency domain transform processing when the fractional domain signal corresponding to the foregoing first modulation order is obtained.

In this embodiment, when frequency domain transform processing is performed on multiple time domain signals received by the receive end (which are sent by the transmit end after performing modulation processing on multiple to-be-sent signals based on different modulation orders $\alpha$), different quantities Q of blocks may be used, that is, different quantities Q of blocks corresponding to the time domain signals obtained based on different modulation orders α, and a correspondence between a modulation order α and a quantity Q of blocks may be preset in the receive end. In this case, as long as the receive end learns a modulation order, a corresponding quantity of blocks can be determined.

When determining the channel compensation matrix corresponding to the frequency domain signal of each block, the receive end directly calculates the channel compensation matrix corresponding to the frequency domain signal of each block as follows:

$$G_q = (G_{q,1}^{H} z_1, G_{q,2}^{H} z_2, \ldots, G_{q,M}^{H} z_M), \quad q=1,2,\ldots,Q$$

where $z_k = [I]_{(k-P)|M:(k+P)|M,:}$, $k=1, 2, \ldots, M$ is used to represent a matrix including all elements from the $((k-P)|M)^{th}$ row to the $((k+P)|M)^{th}$ in an M×M identity matrix I; $G_{q,k} = (\tilde{H}_k \tilde{H}_k^H + N_0 I_{2P+1})^{-1} h_k$, $k=1, 2, \ldots, M$, where $I_{2P+1}$ is an identity matrix of $(2P+1)*(2P+1)$; $h_k$ is an element of the $k^{th}$ column in $\tilde{H}_k$, $k=1, 2, \ldots, M$; and $N_0$ is noise power; and $$\tilde{H}_k = \begin{cases} \hat{H}_q, & -P < p < P \\ 0, & \end{cases},$$

where $\hat{H}_q = z_k H_q$, $H_q$ is a frequency domain channel matrix of the $q^{th}$ block; the foregoing $(.)^H$ represents conjugate transpose of a matrix or a vector.

Figure 7:
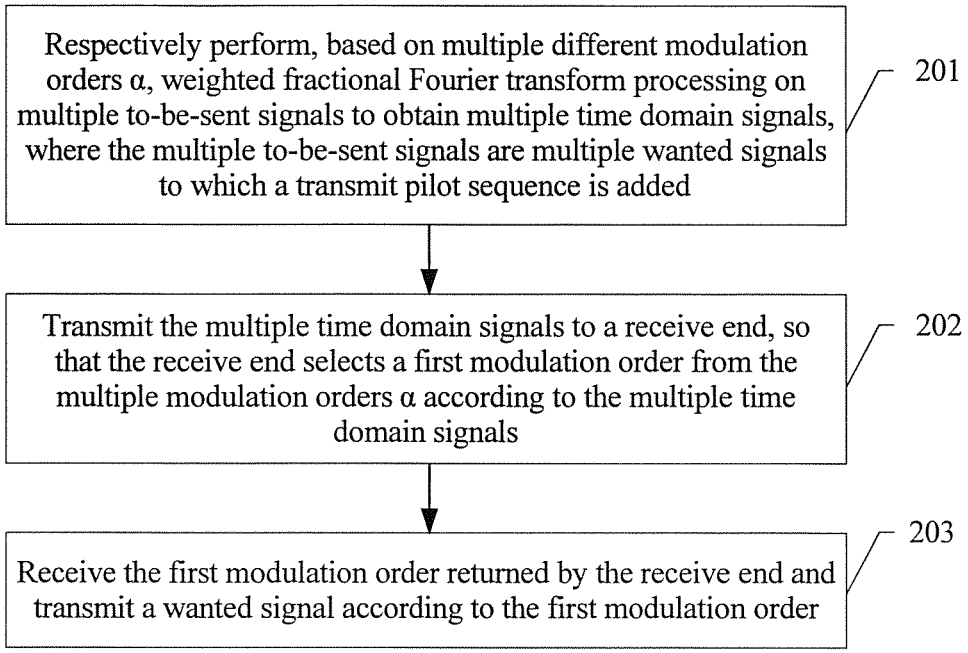
FIG. 7 is a flowchart of another method for compensating for a doubly selective channel according to an embodiment of the present invention.

An embodiment of the present invention provides a method for compensating for a doubly selective channel, which is mainly applied to compensate for a doubly selective channel when a doubly selective channel is used for communication in a hybrid carrier system. In this embodiment, the method is mainly executed by a communication transmit end, that is, the communications device in the foregoing device embodiment 3 or 4. A flowchart is shown in FIG. 7, which includes:

Step 201: A transmit end respectively performs, based on multiple different modulation orders α, weighted fractional Fourier transform processing on multiple to-be-sent signals to obtain multiple time domain signals, where the multiple to-be-sent signals are multiple wanted signals to which a transmit pilot sequence is added.

Specifically, the transmit end may perform, based on multiple different modulation orders α, an $-\alpha^{th}$ order weighted fractional Fourier transform on the multiple to-be-sent fractional domain signals to obtain multiple time domain signals.

Step 202: The transmit end transmits the multiple time domain signals to a receive end, so that the receive end selects a first modulation order from the multiple modulation orders α according to the multiple time domain signals. Specifically, the receive end may obtain the first modulation order according to the method in steps 101 to 105 in the foregoing embodiment, and return the first modulation order to the transmit end. Details are not described herein.

In a specific embodiment, when transmitting the time domain signals, to suppress inter-symbol interference, the transmit end may first add a prefix to the time domain signals, where the prefix refers to a cyclic prefix formed by copying and placing a segment of signal included in the time domain signals in front of the time domain signals; and then transmit the time domain signals to which the prefix is added.

Step 203: When the transmit end receives a first modulation order returned by the receive end, where the first modulation order is an optimal modulation order determined by the receive end, the transmit end transmits a wanted signal according to the first modulation order in subsequent transmission of a wanted signal.

Figure 8:
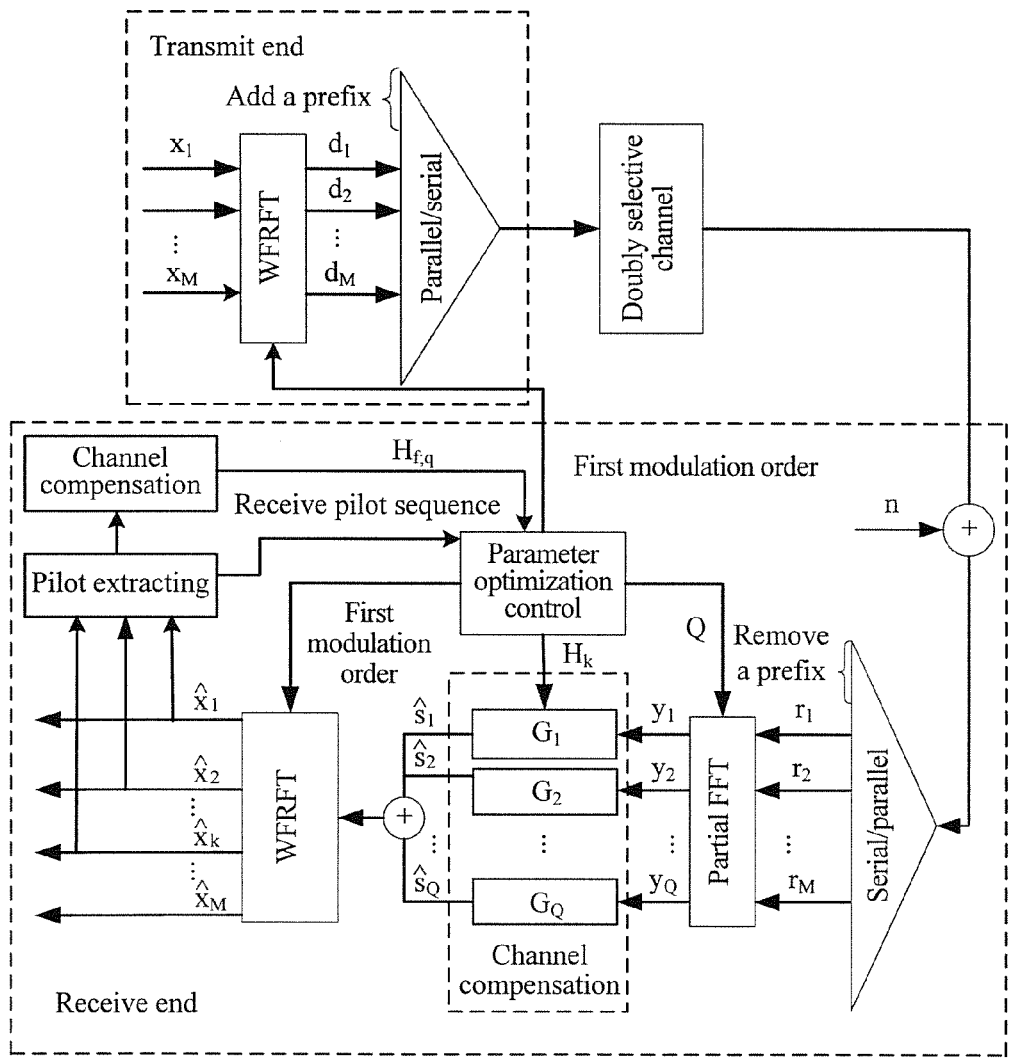
FIG. 8 is a schematic structural diagram of a receive end and a transmit end when implementing a method for compensating for a doubly selective channel in an application embodiment of the present invention.

The following describes a channel compensation method in this embodiment of the present invention by using a specific embodiment. In this embodiment, schematic structural diagrams of the transmit end and the receive end are shown in FIG. 8, which includes:

1. The receive end includes a WFRFT module and a parallel/serial conversion module.

(a) The WFRFT module of the receive end respectively performs an $-\alpha^{th}$ order WFRFT transform on multiple to-be-sent signals of a length M, such as binary phase shift keying (Binary Phase Shift Keying, BSPK) signals or quadrature phase shift keying (Quadrature Phase Shift Keying, QPSK) signals, based on multiple different modulation orders α to obtain multiple time domain signals. The multiple to-be-sent signals are wanted signals to which a transmit pilot sequence is added. It is assumed that a to-be-sent signal is a fractional domain signal $X=(x_1, x_2, \ldots, x_M)^T$ of an $\alpha^{th}$ order. A time domain signal $D=(d_1, d_2, \ldots, d_M)^T$ is obtained after an $-\alpha^{th}$ order WFRFT transform, which may be specifically represented as:

$$D = W_{-\alpha} X \qquad (1)$$

In this embodiment, after the receive end performs a WFRFT transform on multiple to-be-sent signals, multiple time domain signals may be obtained, that is, $D1 = W_{-\alpha 1} X1$, $D2 = W_{-\alpha 2} X2$, $D3 = W_{-\alpha 3} X3, \ldots$.

In a specific application embodiment, the WFRFT module may use a discrete four-term weighted fractional Fourier transform. Specifically:

For a discrete signal sequence X of a length M, an $\alpha^{th}$ order discrete four-term weighted fractional Fourier transform of X is $F_s^{\alpha}[X] = W_\alpha X$, where $F_s^{\alpha}$ represents a four-term weighted fractional Fourier transform, and $W_\alpha$ is a weighted matrix. In a case in which no ambiguity is caused, in this embodiment of the present invention, $W_\alpha$ is denoted as W for short. $W = A_0(\alpha)I + A_1(\alpha)F + A_2(\alpha)\Gamma I + A_3(\alpha)\Gamma F$, where $A_0(\alpha) \sim A_3(\alpha)$ is a weighting coefficient, which is defined as follows:

$$A_k(\alpha) = \cos\left(\frac{(\alpha-k)\pi}{4}\right)\cos\left(\frac{2(\alpha-k)\pi}{4}\right)\exp\left(\frac{3(\alpha-k)\pi i}{4}\right),$$

$(k = 0, 1, 2, 3)$

I is an M×M identity matrix, F is an M×M discrete Fourier transform matrix, and exp(.) represents an $^e$ exponent operator. $\Gamma$ is a permutation matrix, where there is only one non-zero element in each row and each column of the permutation matrix. F and $\Gamma$ may be specifically represented as follows:

$$F = \frac{1}{\sqrt{N}} \begin{bmatrix} 1 & 1 & 1 & \cdots & 1 \\ 1 & \varpi & \varpi^2 & \cdots & \varpi^{N-1} \\ 1 & \varpi^2 & \varpi^4 & \cdots & \varpi^{2(N-1)} \\ \vdots & \vdots & \vdots & \vdots & \vdots \\ 1 & \varpi^{N-1} & \varpi^{2(N-1)} & \cdots & \varpi^{(N-1)(N-1)} \end{bmatrix},$$

-continued $$\Gamma = \begin{bmatrix} 1 & 0 & 0 & 0 & 0 \\ 0 & 0 & 0 & 0 & 1 \\ \vdots & \vdots & & \vdots & \vdots \\ 0 & 0 & 1 & 0 & 0 \\ 0 & 1 & 0 & 0 & 0 \end{bmatrix}$$

where $\tilde{\omega}=e^{-j2\pi/N}$; in addition, an inverse weighted fractional Fourier transform may be represented as $F_s^{-\alpha}[X] = W_{-\alpha}X$, where $W_{-\alpha}$ represents an inverse matrix of $W_\alpha$; similarly, in a case in which no ambiguity is caused, in this embodiment of the present invention, $W_{-\alpha}$ is denoted as $W^{-1}$ for short; it can be proven that W is a unitary matrix, and according to a property of the unitary matrix, $W^{-1}=W^H$. In addition, it can be proven that the matrix $W_\alpha$ meets additivity of a transform order, that is, $W_{\alpha+\beta}=W_\alpha W_\beta$. It needs to be noted that, the hybrid carrier system mentioned in the present invention is implemented through a WFRFT transform.

(b) For each time domain signal, after the parallel/serial conversion module performs parallel/serial conversion, to suppress inter-symbol interference, a cyclic prefix of a length $L_{cp}$ is added to a time domain signal after parallel/serial conversion, and duration of the cyclic prefix may be set to be greater than a maximum channel delay spread; and then the time domain signal to which the prefix is added is transmitted on a doubly selective channel.

Figure 9:
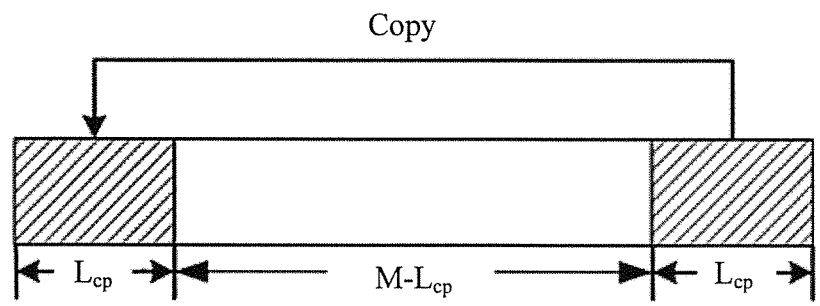
FIG. 9 is a schematic structural diagram of a transmit end when adding a prefix to a time domain signal in an application embodiment of the present invention.

Here, in the case of a doubly selective channel, due to a multi-path effect, there is a delay for a signal in each propagation path, which may be referred to as a channel delay. A maximum delay time in these propagation paths is the maximum channel delay spread. Referring to FIG. 9, when adding a cyclic prefix, the parallel/serial conversion module copies a segment of signal included in a signal D of a length M, that is, the last segment of signal with a length of $L_{cp}$ signal sampling points, and places the segment of signal in front of the signal D as a cyclic prefix. It is assumed that a sampling interval of the time domain signals is $T_c$, and then duration of the cyclic prefix is $T_{cp}=L_{cp}T_c$.

2. The receive end includes a serial/parallel conversion module, a partial FFT module, a channel compensation module, a WFRFT module, a parameter optimization control module, a channel estimation module, and a pilot extracting module.

(a) After the receive end receives the time domain signals, the serial/parallel conversion module of the receive end first removes a prefix added by the transmit end, and in this case, the time domain signals may be represented as:

$$R=H_t D+n \quad (2)$$

where $R=(r_1, r_2, \ldots, r_M)^T$; $H_t$ is a time domain matrix form of a time-varying channel; it is assumed that $H_t$ is an M×M cyclic convolution matrix; $[H_t]_{k,(k-1)|M+1}=h_{k,l}$, $k=1, 2, \ldots, M$, $l=1, 2, \ldots, L$, here, $(k-l)|M$ represents a result of modulo of $k-l$ with respect to M and $h_{k,l}$ represents a time domain impulse response;

n is Gaussian white noise; because there is noise interference during signal transmission on a doubly selective channel, here, all signals processed at the receive end by default are signals to which noise is added.

(b) At first, the partial FFT module evenly splits a time domain signal $R=(r_1, r_2, \ldots, r_M)^T$ that has been processed by the serial/parallel conversion module into Q mutually disjoint blocks of signals, and adds each block of signals with a zero, so that a length of each block of signals is M, where the $q^{th}$ (q=1, 2, ..., Q) block of signals may be represented as:

$$R_q=[0_{1\times[(q-1)U]},(R(1+(q-1)U:qU))^T,0_{1\times(M-qU)}]^T, q=1, 2, \ldots Q. \quad (3)$$

where R(1+(q-1)U:qU) means that the $(1+(q-1)U)^{th}$ to $(qU)^{th}$ elements in a column vector R of time domain signals are fetched to form a column vector, here U=M/Q; and it needs to be noted that, $R_q$ is a column vector signal of a length M.

Then the partial FFT module performs a Fourier transform on each block of signals to obtain a frequency domain signal of each block, and the obtained frequency domain signal of the $q^{th}$ block may be represented as:

$$Y_q=FR_q, q=1,2,\ldots Q \quad (1)$$

where $Y_q$ is a column vector of a length M, F is still the above-mentioned M×M Fourier transform matrix.

(c) The channel compensation module uses the banded MMSE equalization method to respectively perform, by using different channel compensation matrixes, channel compensation processing on the frequency domain signal of each block that is obtained by means of processing by the partial FFT module.

Here, it is assumed that a channel compensation matrix for the frequency domain signal of the $q^{th}$ block is $G_q$, and $G_q$ is an M×M matrix; a frequency domain signal of a block after channel compensation may be represented as:

$$\hat{S}_q=G_q Y_q, q=1,2,\ldots,Q \quad (5)$$

Then the compensated frequency domain signals of all the blocks are superposed to obtain a compensated frequency domain signal $\hat{S}$.

$$\hat{S} = \sum_{q=1}^{Q} \hat{S}_q \quad (6)$$

(d) The WFRFT module performs an $(\alpha-1)^{th}$ order weighted fractional Fourier transform on the compensated frequency domain signal $\hat{S}$ to obtain a fractional domain signal of an original a order, which may be specifically represented as:

$$X=W_{\alpha-1}\hat{S} \quad (7)$$

The following describes an expression of a channel compensation matrix used when the channel compensation module performs channel compensation:

First, the foregoing formula (3) may be represented in the following matrix form:

$$R_q=i_q R, q=1,2,\ldots,Q \quad (8)$$

where $i_q=\text{diag}([0_{1\times[(q-1)M/Q]},1_{1\times(M/Q)},0_{1\times(M-qM/Q)}])$, $i_q$ represents an M×M diagonal matrix. Let $S=W_{-\alpha+1}D$, and because $W_{-\alpha}=F^{-1}W_{-\alpha+1}$, the foregoing formula (4) may be represented in the following form:

$$Y_q = Fi_q R \quad (9)$$
$$= Fi_q H_t W^{-\alpha}D + Fn$$
$$= H_q S + Fn, \quad q = 1, 2, \ldots, Q$$

where $H_q=Fi_q H_t F^H$ represents a frequency domain channel matrix of the $q^{th}$ block, and let $z_k=[I]_{(k-P)|M:(k+P)|M,:}$, k=1, 2, . . . , M represents a matrix including all elements from the $((k-P)|M)^{th}$ row to the $((k+P)|M)^{th}$ in an M×M identity matrix I. P is a constant, whose value is generally P<<M. Selection of P is related to a magnitude of Doppler. In this embodiment of the present invention, let $P=\lceil f_d M \rceil+1$, where $f_d$ is a maximum Doppler shift, for example, for M=64, $[I]_{62:2,:}$ indicates that elements in the sixty-second row, the sixty-third row, the sixty-fourth row, the first row, and the second row of the matrix I are sequentially extracted and combined to form a matrix.

Let $Y_{q,k}=z_k Y_q$, $H_q=z_k H_q$. For further simplified calculation, it is assumed that the following equation holds true:

$$[\tilde{H}_k]_{m,n+p} = \begin{cases} [\tilde{H}_q]_{m,n+p}, & -P < p < P \\ 0, & \end{cases} \quad (10)$$

then by using a minimum mean square error criterion, the channel compensation matrix of the frequency domain signal of the $q^{th}$ block may be represented as:

$$G_{q,k}=(\tilde{H}_k \tilde{H}_k^H + N_0 I_{2P+1})^{-1} h_k, \ k=1,2,\ldots,M \quad (11)$$

where $I_{2P+1}$ represents an identity matrix of (2P+1)×(2P+1), $h_k$ is an element in the $k^{th}$ column in $\tilde{H}_k$, $N_0$ is noise power, it is assumed that the noise power is estimable, $G_{q,k}$ represents a column vector of M×1, $\hat{s}_{q,k}=G_{q,k}^H Y_{q,k}$, and $\hat{s}_{q,k}$ represents the $k^{th}$ element of $\hat{s}_q$.

Therefore, formula (5) may be represented as:

$$\hat{S}_q = (G_{q,1}^H Y_{q,1}, G_{q,2}^H Y_{q,2}, \ldots, G_{q,M}^H Y_{q,M}) \quad (12)$$
$$= (G_{q,1}^H z_1, G_{q,2}^H z_2, \ldots, G_{q,M}^H z_M) Y_q, \quad q=1,2,\ldots,Q$$

With reference to the foregoing formulas (5) and (12), the channel compensation matrix corresponding to the frequency domain signal of each block may be represented as:

$$G_q=(G_{q,1}^H z_1, G_{q,2}^H z_2, \ldots, G_{q,M}^H z_M), \ q=1,2,\ldots,Q \quad (13)$$

(e) The pilot extracting module extracts a receive pilot sequence from the fractional domain signal obtained by the WFRFT module and transmits the receive pilot sequence to the parameter optimization control module.

The channel estimation module connected to the pilot extracting module is intended to estimate information about a channel, including parameters such as Doppler, a channel gain, and a multi-path delay. These parameters are used when the parameter optimization control module selects an optimized modulation order and an optimized channel compensation parameter.

(f) For the multiple time domain signals (obtained by the transmit end by processing original signals based on different modulation orders) received by the receive end, after passes through the serial/parallel conversion module, the partial FFT module, the channel compensation module, the WFRFT module, and the pilot extracting module, a receive pilot sequence Z is obtained.

The parameter optimization control module determines a first modulation order and a quantity Q of blocks corresponding to one of the receive pilot sequences according to the following optimization method, and then obtains a channel compensation matrix of the frequency domain signal of each block according to the foregoing formula (13):

$$\underset{\alpha, Q}{\operatorname{argmin}} \left| Z \left( W_{\alpha-1} \left( \sum_{q=1}^{Q} G_q Y_q \right)^T \right) - Z(X) \right|^2 \quad (14)$$

where $$\underset{\alpha, Q}{\operatorname{argmin}} |\bullet|^2$$

represents values of a modulation order and a quantity of blocks, which enable a minimum mean square error between a receive pilot sequence and a transmit pilot sequence, and Z( ) means that a pilot sequence is fetched.

Then, the parameter optimization control module feeds back the obtained first modulation order to the transmit end and the WFRFT module of the receive end, so that the transmit end and the WFRFT module of the receive end perform a weighted fractional Fourier transform according to the first modulation order during subsequent signal processing; transfers the obtained quantity Q of blocks to the partial FFT module of the receive end, so that the partial FFT module uses Quantity Q of blocks for block splitting in a subsequent frequency domain transform processing process; and transfers the calculated channel compensation matrix to the channel compensation module of the receive end, so that the channel compensation module performs processing according to the calculated channel compensation matrix in a subsequent channel compensation process.

The symbols of the formulas in the foregoing embodiments are described as follows: $(.)^T$ represents transpose of a matrix or a vector; $(.)^H$ represents conjugate transpose of a matrix or a vector; symbol a|b represents modulo of a numerical value a with respect to a numerical value b; $W_\alpha$ is an $\alpha^{th}$ order weighted matrix; $[\bullet]_{m,n}$ represents an element in the $m^{th}$ row and the $n^{th}$ column of a matrix; $[\bullet]_{m:n,:}$ represents a matrix including all elements fetched from the $m^{th}$ row to the $n^{th}$ row in a matrix; $0_{1 \times N}$ represents a 1×N all-zero vector; $1_{1 \times N}$ represents a 1×N all-one vector; diag (B) represents a diagonal matrix including a vector B; and $\lceil \bullet \rceil$ represents an upper bound of a numerical value.

In a practical application embodiment, it is assumed that a signal length M=256, bandwidth B=12 kHz, a center frequency $f_c$=30 kHz, and normalized maximum Doppler $f_d T$ is 0.32, where $f_d$ is a maximum Doppler shift and T is a sampling interval. A 12-path wide sense non-stationary scattering model is used to simulate a doubly selective channel, and a channel delay spread is 0.9 ms, P=3, and a quantity of blocks Q=2. After channel compensation is performed according to the foregoing method, a correspondence between a signal bit error rate (BER) and a signal-to-noise ratio (SNR) is finally obtained, as shown in FIG. 10.

Figure 10:
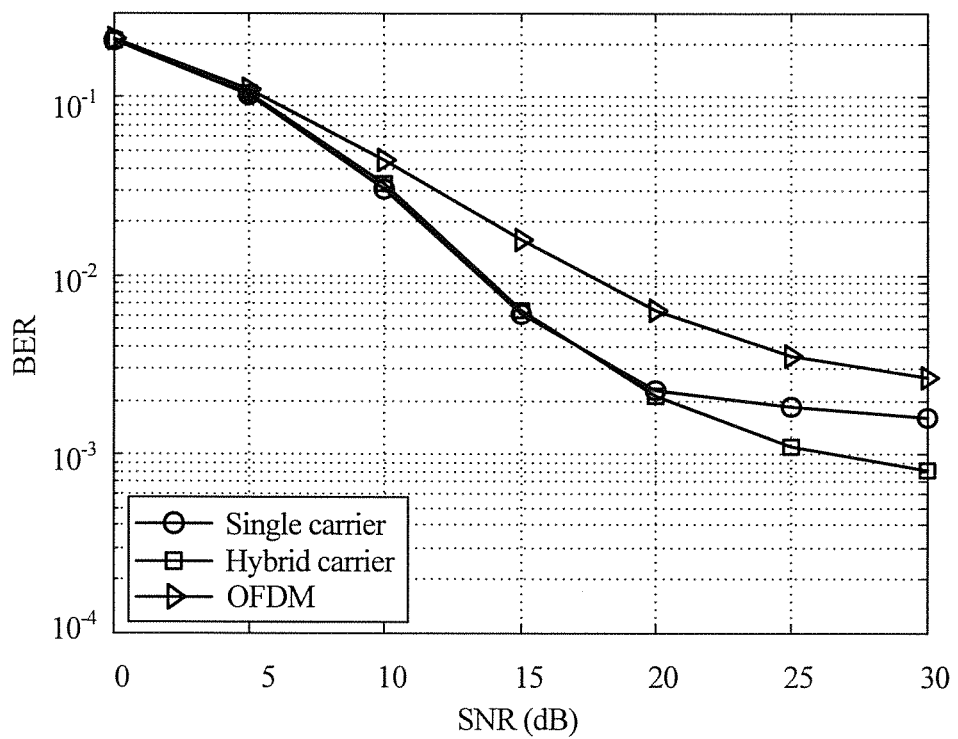
FIG. 10 is a diagram of a correspondence between a signal bit error rate and a signal-to-noise ratio after a method for compensating for a doubly selective channel is adopted in multiple systems in an application embodiment of the present invention.

It can be seen from FIG. 10 that, compared with application of the method in this embodiment of the present invention to an OFDM system, applying the method in this embodiment of the present invention to a hybrid carrier system (it is assumed that an obtained optimal modulation order is 0.5) may significantly reduce a bit error rate and improve communication quality. In addition, compared with application of the method in this embodiment of the present invention to a traditional single carrier system, applying the method in this embodiment of the present invention to a hybrid carrier system can significantly reduce a bit error rate when a signal-to-noise ratio is greater than 20 dB.

A person of ordinary skill in the art may understand that all or a part of the steps of the methods in the embodiments may be implemented by a program instructing relevant hardware. The program may be stored in a computer readable storage medium. The storage medium may include: a read-only memory (ROM), a random-access memory (RAN), a magnetic disk, or an optical disc.

The method and system for compensating for a doubly selective channel, and the related apparatus provided in the embodiments of the present invention are described in detail above. Specific examples are used in this specification to describe the principle and implementation manners of the present invention. The description of the foregoing embodiments is intended merely to help understand the method and core ideas of the present invention. In addition, a person of ordinary skill in the art can make variations and modifications to the present invention in terms of the specific implementation manners and application scope according to the ideas of the present invention. Therefore, the content of this specification shall not be construed as a limitation on the present invention.

What is claimed is:

1. A communications device, comprising:
   a memory storage comprising instructions;
   one or more processors in communication with the memory, wherein the one or more processors execute the instructions to:
   receive multiple time domain signals transmitted by a transmit end, wherein the multiple time domain signals are obtained by the transmit end by respectively performing a weighted fractional Fourier transform on multiple to-be-sent signals based on multiple different modulation orders $\alpha$, and the multiple to-be-sent signals are multiple wanted signals to which a transmit pilot sequence is added;
   sequentially perform partial fast Fourier transform processing, channel compensation processing, and $(\alpha-1)^{th}$ order weighted fractional Fourier transform processing on each time domain signal of the multiple time domain signals received by the signal receiving unit, to obtain a corresponding fractional domain signal;
   extract a receive pilot sequence in the fractional domain signal that is corresponding to each of the multiple time domain signals obtained by the fractional signal obtaining unit, and calculate a mean square error between the extracted receive pilot sequence and a transmit pilot sequence;
   select a first modulation order of a fractional domain signal corresponding to a minimum mean square error from the mean square errors that are respectively calculated by the extraction and calculation unit according to the fractional domain signals corresponding to the multiple time domain signals, and determine a channel compensation parameter corresponding to the first modulation order;
   send the first modulation order to the transmit end, so that the transmit end transmits a wanted signal according to the first modulation order; and
   perform channel compensation by using the channel compensation parameter.

2. The communications device according to claim 1, wherein the one or more processors further execute the instructions to:
   separately remove a prefix of the multiple time domain signals received by the signal receiving unit before the fractional signal obtaining unit obtains the fractional domain signal, wherein the prefix of the time domain signals is a cyclic prefix formed when the transmit end copies and places a segment of signal comprised in an original time domain signal in front of the original time domain signal; sequentially perform partial fast Fourier transform processing, channel compensation processing, and $(\alpha-1)^{th}$ order weighted fractional Fourier transform processing on each prefix-removed time domain signal of the multiple prefix-removed time domain signals, to obtain a corresponding fractional domain signal.

3. The communications device according to claim 1, wherein the one or more processors execute the instructions to:
   evenly split a wanted signal of a length M in the time domain signals received by the communications device or the prefix-removed time domain signals obtained by the communications device into Q blocks of signals; add each block of signals with a zero so that a length of each block of signals is M; and perform a Fourier transform on each zero-added block of signals to obtain a frequency domain signal of each block, wherein Q is greater than or equal to 2;
   respectively perform, by using different channel compensation matrixes, channel compensation on the frequency domain signals of all blocks, and superpose the compensated frequency domain signals of all the blocks to obtain a compensated frequency domain signal; and
   perform an $(\alpha-1)^{th}$ order weighted fractional Fourier transform on the compensated frequency domain signal, to obtain a fractional domain signal.

4. The communications device according to claim 3, wherein:
   the channel compensation parameter comprises a channel compensation matrix corresponding to the frequency domain signal of each block; and
   the one or more processors execute the instructions to:
   select a first modulation order of a fractional domain signal corresponding to a minimum mean square error from the mean square errors that are respectively calculated according to the fractional domain signals corresponding to the multiple time domain signals,
   determine a quantity Q of blocks used for partial fast Fourier transform processing when the fractional domain signal corresponding to the first modulation order is obtained, and
   calculate the channel compensation matrix corresponding to the frequency domain signal of each block as follows:

$$G_q = (G_{q,1}{}^H z_1, G_{q,2}{}^H z_2, \ldots, G_{q,M}{}^H z_M), q=1,2,\ldots,Q$$

where $z_k = [I]_{(k-P)|M:(k+P)|M,:}$, $k=1, 2, \ldots, M$ is used to represent a matrix including all elements from the $((k-P)|M)^{th}$ row to the $((k+P)|M)^{th}$ in an M×M identity matrix I;
$G_{q,k} = (\tilde{H}_k \tilde{H}_k{}^H + N_0 I_{2P+1})^{-1} h_k$, $k=1, 2, \ldots, M$, where $I_{2P+1}$ is an identity matrix of $(2P+1)*(2P+1)$; $h_k$ is an element of the $k^{th}$ column in $\tilde{H}_k$, $k=1, 2, \ldots, M$; and $N_0$ is noise power; and $$\tilde{H}_k = \begin{cases} \hat{H}_q, & -P < p < P \\ 0, & \end{cases},$$

where $\hat{H}_q=z_k H_q$, $H_q$ is a frequency domain channel matrix of the $q^{th}$ block; the foregoing $(.)^H$ represents conjugate transpose of a matrix or a vector.

5. A communications device, comprising:
a memory storage comprising instructions;
one or more processors in communication with the memory, wherein the one or more processors execute the instructions to:
respectively perform, based on multiple different modulation orders α, weighted fractional Fourier transform processing on multiple to-be-sent signals to obtain multiple time domain signals; wherein the multiple to-be-sent signals are multiple wanted signals to which a transmit pilot sequence is added;
transmit the multiple time domain signals to a receive end, so that the receive end selects a first modulation order from the multiple modulation orders α according to the multiple time domain signals; and
receive the first modulation order returned by the receive end and transmit a wanted signal according to the first modulation order.

6. The communications device according to claim 5, wherein the one or more processors execute the instructions to:
perform, based on multiple different modulation orders α, an $-\alpha^{th}$ order weighted fractional Fourier transform on multiple fractional domain signals to obtain multiple time domain signals.

7. The communications device according to claim 5, wherein the one or more processors execute the instructions to:
add a prefix to the time domain signals, wherein the prefix refers to a cyclic prefix formed by copying and placing a segment of signal comprised in the time domain signals in front of the time domain signals; and
transmit, to the receive end, the time domain signals to which the prefix is added.

8. A method for compensating for a doubly selective channel, the method comprising:
receiving multiple time domain signals transmitted by a transmit end, wherein the multiple time domain signals are obtained by the transmit end by respectively performing a weighted fractional Fourier transform on multiple to-be-sent signals based on multiple different modulation orders α, and the multiple to-be-sent signals are multiple wanted signals to which a transmit pilot sequence is added;
sequentially performing partial fast Fourier transform processing, channel compensation processing, and $(\alpha-1)^{th}$ order weighted fractional Fourier transform processing on each time domain signal of the multiple time domain signals to obtain a corresponding fractional domain signal;
extracting a receive pilot sequence in the fractional domain signal that is corresponding to each of the multiple time domain signals, and calculating a mean square error between the extracted receive pilot sequence and a transmit pilot sequence;
selecting a first modulation order of a fractional domain signal corresponding to a minimum mean square error from the mean square errors that are respectively calculated according to the fractional domain signals corresponding to the multiple time domain signals, and determining a channel compensation parameter corresponding to the first modulation order; and
sending the first modulation order to the transmit end, so that the transmit end sends a wanted signal according to the first modulation order; and performing channel compensation by using the determined channel compensation parameter.

9. The method according to claim 8, wherein after receiving time domain signals transmitted by a transmit end, the method further comprises:
removing a prefix of the time domain signals, wherein the prefix of the time domain signals is a cyclic prefix formed when the transmit end copies and places a segment of signal comprised in an original time domain signal in front of the original time domain signal; and
sequentially performing partial fast Fourier transform processing, channel compensation processing, and $(\alpha-1)^{th}$ order weighted fractional Fourier transform processing on each prefix-removed time domain signal of the multiple prefix-removed time domain signals to obtain a corresponding fractional domain signal.

10. The method according to claim 8, wherein sequentially performing partial fast Fourier transform processing, channel compensation processing, and $(\alpha-1)^{th}$ order weighted fractional Fourier transform processing on the time domain signals to obtain a fractional domain signal comprises:
evenly splitting a wanted signal of a length M in the time domain signals or the prefix-removed time domain signals into Q blocks of signals; adding each block of signals with a zero so that a length of each block of signals is M; and performing a Fourier transform on each zero-added block of signals to obtain a frequency domain signal of each block, wherein Q is greater than or equal to 2;
respectively performing, by using different channel compensation matrixes, channel compensation on the frequency domain signals of all the blocks, and superposing the compensated frequency domain signals of all the blocks to obtain a compensated frequency domain signal; and
performing an $(\alpha-1)^{th}$ order weighted fractional Fourier transform on the compensated frequency domain signal to obtain a fractional domain signal.

11. The method according to claim 10, wherein
the channel compensation parameter comprises a channel compensation matrix corresponding to the frequency domain signal of each block; and
determining a channel compensation parameter corresponding to the first modulation order comprises:
determining a quantity Q of blocks used for partial fast Fourier transform processing when a fractional domain signal corresponding to the first modulation order is obtained, and
calculating the channel compensation matrix corresponding to the frequency domain signal of each block as follows:

$$G_q=(G_{q,1}^H z_1, G_{q,2}^H z_2, \ldots, G_{q,M}^H z_M), q=1,2,\ldots,Q$$

where $z_k=[I]_{(k-P)|M:(k+P)|M,:}$, k=1, 2, ..., M is used to represent a matrix including all elements from the $((k-P)|M)^{th}$ row to the $((k+P)|M)^{th}$ in an M×M identity matrix I;
$G_{q,k}=(\tilde{H}_k \tilde{H}_k^H + N_0 I_{2P+1})^{-1} h_k$, k=1, 2, ..., M, where $I_{2P+1}$ is an identity matrix of (2P+1)*(2P+1); $h_k$ is an element of the $k^{th}$ column in $\tilde{H}_k$, k=1, 2, ..., M; and $N_0$ is noise power; and $$\tilde{H}_k = \begin{cases} \hat{H}_q, & -P < p < P \\ 0, & \end{cases},$$

where $\hat{H}_q = z_k H_q$, $H_q$ is a frequency domain channel matrix of the $q^{th}$ block; the foregoing $(.)^H$ represents conjugate transpose of a matrix or a vector.

12. A method for compensating for a doubly selective signal, the method comprising:

respectively performing, based on multiple different modulation orders α, weighted fractional Fourier transform processing on multiple to-be-sent signals to obtain multiple time domain signals; wherein the multiple to-be-sent signals are multiple wanted signals to which a transmit pilot sequence is added;

transmitting the multiple time domain signals to a receive end, so that the receive end selects a first modulation order from the multiple modulation orders α according to the multiple time domain signals; and receiving the first modulation order returned by the receive end and transmitting a wanted signal according to the first modulation order.

13. The method according to claim 12, wherein respectively performing, based on multiple different modulation orders α, weighted fractional Fourier transform processing on multiple to-be-sent signals to obtain multiple time domain signals comprises:

performing, based on multiple different modulation orders α, an $-\alpha^{th}$ order weighted fractional Fourier transform on multiple to-be-sent fractional domain signals to obtain multiple time domain signals.

14. The method according to claim 12, wherein transmitting the multiple time domain signals to a receive end comprises:

adding a prefix to the time domain signals, wherein the prefix refers to a cyclic prefix formed by copying and placing a segment of signal comprised in the time domain signals in front of the time domain signals; and transmitting, to the receive end, the time domain signals to which the prefix is added.

* * * * *